(No Model.)
E. KILBORN.
EGG BEATER.
No. 303,022.        Patented Aug. 5, 1884.
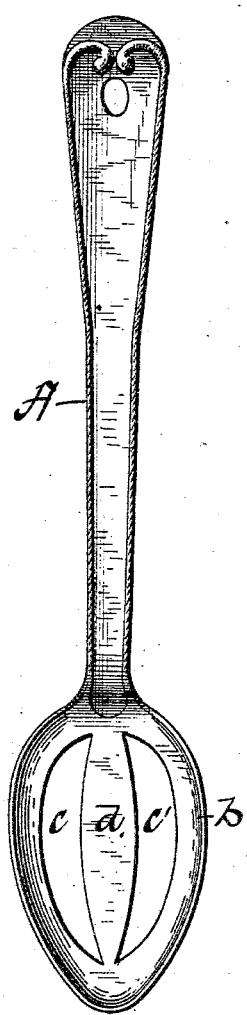
WITNESSES
INVENTOR
Eugenia Kilborn

UNITED STATES PATENT OFFICE.

EUGENIA KILBORN, OF CEDAR RAPIDS, IOWA.

EGG-BEATER.

SPECIFICATION forming part of Letters Patent No. 303,022, dated August 5, 1884.

Application filed June 9, 1884. (No model.)

*To all whom it may concern:*

Be it known that I, EUGENIA KILBORN, a citizen of the United States of America, residing at Cedar Rapids, in the county of Linn, in the State of Iowa, have invented a new and useful Improvement in Beaters for Eggs, Cakes, &c., of which the following is a specification.

My invention has relation to means for beating eggs, &c., and the object is to provide a utensil for the purpose stated which is cheap and durable in construction, and which will perform the purposes intended in a satisfactory manner.

My invention consists in the improved article, hereinafter fully described and set forth.

In the accompanying drawings, forming a part of this specification, and fully illustrative of my improved device, the letter A represents the device made in the form of a spoon, the bowl $b$ whereof is formed with elongated slots $c\ c'$, arranged on each side of the central piece or bar, $d$, extending from the base of the handle to the point of the spoon, substantially as shown.

The article may be manufactured from a blank struck out by means of dies; or ordinary mixing-spoons may be changed to the improved device by having slots cut into them, substantially as shown.

It will be observed that the frame of the spoon is strengthened by means of the central piece of bar $d$, so as to obviate the tendency to warp or bend, as in case of devices having but a single opening, and that at the same time the utility and capacity of the device as a stirrer or beater are enhanced by the fact that the apertures can be made of such a shape and size as to allow the material ready passage through them.

What I claim as my invention, and desire to secure by Letters Patent, is—

As an improved article of manufacture, the egg beater herein described, consisting of a suitable handle and a bowl, $b$, formed with the elongated slots $c\ c'$, arranged on each side of the central bar or brace, $d$, substantially as described, and for the purpose set forth.

In testimony whereof I have hereunto set my hand in the presence of two attesting witnesses.

EUGENIA KILBORN.

Attest:
  I. N. WHITTAM,
  JAMES J. CHILD.